US011645482B2

(12) United States Patent
Stagg

(10) Patent No.: US 11,645,482 B2
(45) Date of Patent: May 9, 2023

(54) RADIO-FREQUENCY IDENTIFICATION (RFID) SYSTEMS AND METHODS FOR CHANGING OPERATOR CONTROL UNIT (OCU) CONFIGURATIONS

(71) Applicant: Cattron North America, Inc., Warren, OH (US)

(72) Inventor: David Stagg, Flat Rock, NC (US)

(73) Assignee: CATTRON NORTH AMERICA, INC., Warren, OH (US)

( * ) Notice: Subject to any disclaimer, the term of this patent is extended or adjusted under 35 U.S.C. 154(b) by 113 days.

(21) Appl. No.: 17/381,419

(22) Filed: Jul. 21, 2021

(65) Prior Publication Data

US 2022/0067314 A1 Mar. 3, 2022

Related U.S. Application Data

(60) Provisional application No. 63/070,649, filed on Aug. 26, 2020.

(51) Int. Cl.
*G06K 7/10* (2006.01)
*G06K 19/07* (2006.01)

(52) U.S. Cl.
CPC ..... *G06K 7/10366* (2013.01); *G06K 19/0723* (2013.01)

(58) Field of Classification Search
USPC ....................................................... 235/375
See application file for complete search history.

(56) References Cited

U.S. PATENT DOCUMENTS

| 6,505,780 | B1 | 1/2003 | Yassin et al. |
| 8,483,914 | B2 | 7/2013 | Copeland et al. |
| 9,460,574 | B2 | 10/2016 | Stagg |
| 9,743,221 | B2 | 8/2017 | Javer et al. |
| 9,975,522 | B2 | 5/2018 | Nakamura et al. |
| 10,976,256 | B2 * | 4/2021 | Rurack ............. G01N 21/6428 |
| 2010/0233957 | A1 | 9/2010 | Dobosz |
| 2012/0194320 | A1 * | 8/2012 | Yeakley ............. G06F 16/1744 340/10.1 |
| 2020/0410180 | A1 * | 12/2020 | Shelton, IV ..... A61B 17/07207 |
| 2021/0003981 | A1 | 1/2021 | Stagg |

FOREIGN PATENT DOCUMENTS

| DE | 102013210414 A1 | 12/2014 |
| EP | 3410407 A1 | 12/2018 |
| WO | WO-2017206337 A1 | 12/2017 |

OTHER PUBLICATIONS

Remtron™ 411, 611 and 325 OCU User Manual, Accessed Aug. 2020, 40 pages.
Extended European Search Report for EP21192367.7 that claims priority to the instant application; dated Jan. 19, 2022, 7 pages.

* cited by examiner

*Primary Examiner* — Allyson N Trail
(74) *Attorney, Agent, or Firm* — Harness, Dickey & Pierce, P.L.C.; Anthony G. Fussner

(57) ABSTRACT

Exemplary embodiments are disclosed of radio-frequency identification (RFID) systems and methods for changing operator control unit (OCU) configurations (e.g., operating frequency, address, operational configuration, etc.). In an exemplary embodiment, a system includes at least one or more radio-frequency identification (RFID) tags associated with at least one or more machines. The at least one or more RFID tags are readable by an RFID reader when the RFID reader and the at least one or more RFID tags are operationally proximate. The at least one or more RFID tags include data useable for changing the configuration of the OCU such that the OCU is configured to be operable with the at least one or more machines.

27 Claims, No Drawings

RADIO-FREQUENCY IDENTIFICATION (RFID) SYSTEMS AND METHODS FOR CHANGING OPERATOR CONTROL UNIT (OCU) CONFIGURATIONS

CROSS-REFERENCE TO RELATED APPLICATION

This application claims the benefit of and priority to U.S. Provisional Patent Application No. 63/070,649 filed Aug. 26, 2020. The entire disclosure of the above application is incorporated herein by reference.

FIELD

The present disclosure relates to RFID systems and methods for changing operator control unit (OCU) configurations (e.g., operating frequency, address, operational configuration, etc.).

BACKGROUND

This section provides background information related to the present disclosure which is not necessarily prior art.

Operator control units (OCUs) may be used for wirelessly and remotely controlling an industrial machine. For example, an OCU may be used for controlling operation of manufacturing equipment, assembly line equipment, press and stamping machines, cranes, hoists, vehicles, rail maintenance-of-way machinery, packaging equipment, testing equipment, etc.

DETAILED DESCRIPTION

Example embodiments will now be described more fully.

Operator control units (OCUs) may be used for wirelessly and remotely controlling industrial machines. Before an OCU is authorized or enabled to control a specific industrial machine (e.g., a specific overhead crane, etc.), a radio-frequency identification (RFID) reader may first be used to read the operator's security badge, which may be in the form of an RFID tag. The operator's OCU may be unable to control the specific industrial machine until (1) the operator's security RFID badge is read by the RFID reader; and (2) it is determined that based on the data obtained from the operator's security badge by the RFID reader, the operator has the appropriate authorization rights to control the specific industrial machine. If it is determined that the operator has the appropriate authorization rights, then the operator's OCU may be enabled and allowed to control operation of the specific industrial machine.

In addition to using RFID for reading security badges to enable OCUs to control specific machines, the inventor hereof has also recognized that it would be beneficial to use RFID for changing an OCU's specific configuration (e.g., frequency, address, operational configuration, etc.) after reading an RFID tag at or near a specific machine to thereby customize or tailor the OCU's specific configuration for use with that specific machine.

Accordingly, disclosed herein are exemplary embodiments of radio-frequency identification (RFID) systems and methods for changing configurations (e.g., operating frequency, address or machine identifier, operational configuration, other telecommand configuration, etc.) of operator control units (OCUs). In exemplary embodiments, an RFID tag may be located at, near, or otherwise assigned or allocated to a specific machine, e.g., a first machine of a plurality of machines, etc. The RFID tag may include OCU configuration data for the specific machine. An RFID reader may be used to read the RFID tag to obtain the OCU configuration data from the RFID tag when the RFID reader and RFID tag are operationally proximate and/or within a sufficiently close range of each other (e.g., within a range in which the machine is controllable by the OCU, etc.). The OCU configuration data retrieved from the RFID tag may be useable for changing (e.g., customizing, tailoring, etc.) an OCU's configuration (e.g., operating frequency, address, operational configuration, other telecommand configuration, etc.) such that the OCU is configured to be operable with (e.g., for remotely controlling, for telecommanding, etc.) the specific machine for which the RFID tag was positioned near, at, or otherwise assigned or allocated.

In an exemplary embodiment, the OCU may be configured with the OCU configuration data from the RFID tag such that the OCU is operable only with the specific machine and not any other machines. The OCU may be unable to control any other nearby machines. In this example, an RFID tag may be associated with each machine, and each RFID tag may have unique OCU configuration data different from the OCU configuration data on the other RFID tags. When the configuration of the OCU is changed according to first OCU configuration data read from a first one of the RFID tags, the OCU is configured to be operable only with the corresponding first machine and not the other machines.

To control a second machine different than the first machine, the second RFID tag near, at, or otherwise allocated or assigned to the second machine may be read by the RFID reader to obtain second OCU configuration data for the second machine. The configuration of the OCU may be changed according to the second OCU configuration data read from the second RFID tag, to thereby repurpose, tailor, and/or customize the OCU to be operable with the second machine. Accordingly, the second OCU configuration data of second RFID tag may be used to tailor or customize the OCU's specific configuration (e.g., operating frequency, address, operational configuration, etc.) such that the OCU is configured to be operable with the second machine having the second RFID tag read by the RFID reader. In this example, the OCU may be configured to operable with only the second machine associated with the second RFID tag that was read by the RFID reader. The OCU may be inoperable with the first machine or other nearby machines due to different OCU configuration requirements for operating the other machines.

In another exemplary embodiment, the OCU may be configured with OCU configuration data from one or more RFID tags such that the OCU is operable for controlling more than one machine associated with the one or more RFID tags. For example, the OCU may be configured with OCU configuration data from one or more RFID tags (e.g., a single RFID tag, multiple RFID tags, etc.) associated with a first group of machines such that the OCU is operable for controlling only machines within the first group of machines. The OCU may be unable to control any other nearby machines that are not within or part of the first group of machines. In this example, one or more RFID tag(s) may be associated with the machines within the first group of machines, and the RFID tag(s) may have a unique OCU configuration data different from the OCU configuration data on other RFID tags associated with machines that are not within or part of the first group of machines. When the configuration of the OCU is changed according to the OCU configuration data read from the one or more RFID tags associated with the machines within the first group of machines, the OCU is configured to be operable only with the machines within the first group of machines and not any other machines.

To control one or more second machines that are not within the first group of machines, one or more second RFID tag(s) near, at, or otherwise allocated or assigned to the one or more second machines may be read by the RFID reader to obtain second OCU configuration data for the one or more second machines. The configuration of the OCU may be changed according to the second OCU configuration data read from the one or more second RFID tag(s), to thereby repurpose, tailor, and/or customize the OCU to be operable with the one or more second machines. Accordingly, the second OCU configuration data of second RFID tag(s) may be used to tailor or customize the OCU's specific configuration (e.g., operating frequency, address, operational configuration, etc.) such that the OCU is configured to be operable with the one or more second machines associated with the one or more second RFID tag(s) read by the RFID reader. In this example, the OCU may be configured to operable with only the one or more second machines associated with the one or more second RFID tags that were read by the RFID reader. The OCU may be inoperable with the first group of machines or other nearby machines due to different OCU configuration requirements for operating the first group of machines or other machines.

In exemplary embodiments, the OCU's configuration (e.g., operating frequency, address or machine identifier, operational configuration, etc.) may be changed locally (e.g., manually or automatically at the operator control unit itself, etc.) after the RFID reader reads the OCU configuration data from the RFID tag. Alternatively, in other exemplary embodiments, the OCU's configuration (e.g., operating frequency, address, operational configuration, etc.) may be changed remotely (e.g., using an OCU configuration server etc.) after the RFID reader reads the OCU configuration data from the RFID tag. By way of example, the operational configuration may include switch/joystick functions, enabling, disabling part or all capabilities, switch joystick ranges/speeds, operational zone restrictions, reconfiguration of displays, enabling/disabling/modifying interactions with the machine and associated machines, etc.

Also, the change(s) to the OCU configuration may be transient (e.g., only lasting for a relatively short time after the OCU configuration has been changed according to the OCU configuration data read from the RFID tag by the RFID reader, etc.). Or, for example, the changes to the OCU configuration may be permanent (e.g., lasting indefinitely, etc.), e.g., at least until another RFID tag is read by the RFID reader to obtain different OCU configuration data for changing the OCU configuration, etc.

The machine(s) may be any suitable machine capable of being operated by an OCU, such as, for example, manufacturing equipment, assembly line equipment, press and stamping machines, cranes, hoists, vehicles, rail maintenance-of-way machinery, packaging equipment, testing equipment, etc. The exemplary systems and methods disclosed herein may include only one machine, more than one machine, and/or may include different machines and/or some substantially similar machines.

The OCU may be any suitable control unit, such as, for example, wireless control equipment, a microcontroller, a programmable logic controller (PLC), etc. The OCU may communicate with and/or control the machine using any suitable communication and/or control protocols, such as, for example, Bluetooth, RF signals, WiFi wireless signals, TCP/IP, etc.

In exemplary embodiments, the OCU may be configured to link with and communicate with (e.g., receive the OCU configuration data read by, etc.) the RFID reader via short-range wireless communication, e.g., a BLUETOOTH short-range wireless communication protocol, an infrared short-range wireless communication protocol, a RFID short-range wireless communication protocol, etc.

The RFID tag may include a transmitting antenna and an integrated circuit (IC) chip or microchip, which includes the memory in which is stored or encoded the RFID tag's data. In some exemplary embodiments, the RFID tag's data may include a secure identity that may be used to match or locate the corresponding OCU configuration (e.g., frequency, address, operational configuration, etc.) in a database or other means that has been stored in a remote control system OCU or MCU (machine control unit). The RFID tag may be configured to transmit the secure identity data to the RFID reader when the RFID tag is triggered by an electromagnetic interrogation pulse from the RFID reader. This may occur after the RFID reader has been transported (e.g., manually carried by the operator or user of the OCU, etc.) relative to the RFID tag such that the RFID reader and RFID tag are operationally proximate and/or within an operational range of each other. The operational range may depend on the whether the RFID tag is a passive tag or an active tag. For example, the RFID tag may be a passive tag powered by energy from the RFID reader's interrogating radio waves in some exemplary embodiments. In other exemplary embodiments, the RFID tag may be an active tag that is self-powered (e.g., by a battery or other power source, etc.) such that the active RFID tag is capable of being read at a greater range from the RFID reader.

In some exemplary embodiments, the RFID tag's data may include OCU configuration data (e.g., frequency, address, operational configuration, etc.) for a specific machine. In such exemplary embodiments, the RFID tag may be configured to transmit the OCU configuration data to the RFID reader when the RFID tag is triggered by an electromagnetic interrogation pulse from the RFID reader.

The OCU, RFID reader, and/or RFID tag may include a secure protocol for identifying a user or operator. For example, the user or operator may have pre-defined authorization right(s), which can be stored locally and/or remotely. The OCU may be configured to allow the operator or user to control a specific machine based on defined authorization rights. The authorization rights may specify what control actions the user is permitted to use for the specific machine, and may include, without limitation, powering the machine on or off, starting operation of the machine, stopping operation of the machine, changing operation of the machine (e.g., increasing or decreasing speed, selecting a different mode of operation, changing the number of actions performed, enabling some functions, disabling some functions, etc.), controlling movement of the machine, etc.

In exemplary embodiments, the OCU(s) includes an RFID reader (e.g., a 125 kilohertz (kHz) RFID reader, etc.) that can be used in at least two modes, including user authorization and OCU configuration to match a specific machine.

For user authorization, the user holds the OCU to an ID badge at start up to be able to select an operational mode. The OCU is configured to associate an ID badge identity (person) to a specific machine and a specific set of available commands. But if no association or match is found for the ID badge identity, the user will not be able to start the OCU. For this mode, there is an associated database of users that have specific rights. The OCU will either allow or deny a user to transition the OCU into active mode. Additionally, a user may call up a specific preprogrammed configuration. For example, a maintenance supervisor may be provided with additional control functionality not available to a normal user. If the OCU is powered OFF after a successful RFID badge read, the process will need to be repeated the next time the OCU is powered ON.

For the OCU configuration to match a specific machine mode, the user holds the OCU to an ID tag located on or near a specific machine at start up to be able to select that specific machine. Accordingly, the OCU can be owned by one user but used freely to control many different machines. For this mode, there is an associated database of machine control units (MCUs) and associated characteristics. The OCU will call up a specific pre-programmed configuration such as frequency, address, button functionality, and any additional required functions.

The two modes of user authorization and OCU configuration to match a specific machine may be similar. For example, both modes may involve the use of a database that respectively cross references either authorized user identities or machine identities to a specific system address and set of configuration parameters. And, the database(s) may be loaded into the OCU and used at startup.

In an exemplary embodiment, the OCU may be configured to be transitioned from passive mode to RFID read mode by pressing and holding a specific function button for a predetermined amount of time (e.g., 5 seconds, less 5 seconds, more than 5 seconds, etc.) and/or the OCU may look (e.g., automatically scan, etc.) for a tag when the OCU is switched on. If the OCU is held to a pre-assigned Personnel ID card or Machine Tag, the OCU will attempt to read the RFID card or tag and set the appropriate parameters. After a successful read, the OCU will revert to passive mode. By way of example only, the table below provides an example of RFID Read Mode LED sequence.

TABLE

RFID Read Mode LED sequence.

| Sequence | E-Stop | A | B | Status | 1 | 2 | Haptic |
|---|---|---|---|---|---|---|---|
| RFID Read State 1 Passive | Off | | | Green | Default | Default | |
| After Pressing Function Button for 5 Seconds | Off | Red F | | Amber | Off | Off | |
| RFID Read Successfully | Off | Amber F | | Amber | Off | Off | |
| Configuration Updated | Off | Green | | Green | Off | Off | |
| Configuration Completed | Off | Off | | Green | Default | Default | 1 Buzz |
| RFID Read Failed | Off | Red | | Amber | Off | Off | 3 Buzz |

In exemplary embodiments, the functionality is implemented in the OCU for reading RFID tags and the correlated changes of configuration of the OCU. By way of example only, a description is provided below of three example use cases for exemplary embodiments of radio-frequency identification (RFID) systems and methods for changing operator control unit (OCU) configurations disclosed herein.

In a first example use case, a user or operator has a personal OCU that can be used on many machines. The user's personal OCU remains generic until the user scans a local RFID reader to the machine RFID tag. At which point, the OCU is then configured for that specific machine. Advantageously, this may simplify OCU reconfiguration and may allow a single OCU to be used with more than one machine.

In a second example use case, only trained personnel are permitted to use a remote control system. The trained personnel have their authorization coded into their RFID security badge(s) that will need to be scanned in order to have their OCUs online. The OCU allows or provides the user with a level of operation appropriate to the user's security clearance. Advantageously, this may eliminate unauthorized use, restrict functionality to a specific competence level, and improve safety.

In a third example use case, each user has an RFID security badge associated with their identity. Each user picks up a wireless E-stop (e.g., an OCU including an emergency stop switch) when needed. The user scans their RFID security badge to read in the user's identity in order to have their wireless E-Stop (OCU) online. If the user actuates the user's E-Stop, the actuation of the E-stop will cause the machine to stop and also to simultaneously transmit the user's identity to the MCU so that a supervisor knows immediately who pressed the E-stop switch. In this example, the E-Stop remains generic and only becomes specific after the user's RFID security badge is scanned.

This third example use case may include a wireless emergency stop system as disclosed in U.S. Patent Application Publication US2021/00039891, the entire disclosure of which is incorporated herein by reference. For example, the wireless emergency stop system may include a machine safety device wired to a machine stop circuit for stopping operation of a machine when the machine stop circuit is activated. The machine safety device includes a wireless communication interface. The system includes multiple personal safety devices. Each personal safety device includes a wireless communication interface for wireless communication with the machine safety device, and an emergency stop switch. The emergency stop switch is configured to, when activated, transmit an emergency stop signal to the machine safety device to trigger an emergency stop of the machine. The machine safety device is configured to maintain wireless connections with more than one of the multiple personal safety devices at the same time. Each personal safety device is configured to wirelessly disconnect from the machine safety device without triggering an emergency stop of the machine in response to the personal safety device receiving activation of at least one operation input on the personal safety device. The at least one operation input may be distinct from activation of the emergency stop switch of the personal safety device and distinct from a loss of wireless communication of the personal safety device with the machine safety device thereby allowing the personal safety device to be wirelessly disconnected from the machine safety device without triggering an emergency stop of the machine.

An exemplary embodiment includes a system for changing a configuration of an operator control unit (OCU). The system includes at least one or more radio-frequency identification (RFID) tags associated with at least one or more machines and readable by an RFID reader when the RFID reader and the at least one or more RFID tags are operationally proximate. The at least one or more RFID tags includes data useable for changing the configuration of the OCU such that the OCU is configured to be operable with the at least one or more machines.

The data of the at least one or more RFID tags may include OCU configuration data useable for changing the configuration of the OCU such that the OCU is configured to be operable with the at least one or more machines. The OCU configuration data may include one or more of operating frequency, address, and/or operational configuration of the at least one or more machines.

The data of the at least one or more RFID tags may include a secure identity useable for matching to a corresponding OCU configuration.

The system may include the RFID reader that is portable and/or manually transportable by an operator of the OCU to a location relative to an RFID tag such that the RFID reader and the RFID tag are operationally proximate to each other and the RFID tag is readable by the RFID reader.

Each said RFID tag may be located at, on, or near a corresponding one of the at least one or more machines. The system may include the OCU having the RFID reader integrated therein such that the OCU and the RFID reader are collectively transportable and/or operable as a single unit. The RFID reader may be coupled for communication with the OCU for communicating the data stored on the at least one or more RFID tags and read by the RFID reader to the OCU.

The data stored on the at least one or more RFID tags may be useable for changing the configuration of the OCU such that the OCU is configurable for remotely controlling and/or telecommanding the at least one or more machines.

The data may be useable for changing the configuration of the OCU such that the OCU is operable only with the at least one or more machines associated with the corresponding at least one or more RFID tags, whereby the OCU is not operable with other adjacent machines.

The at least one or more RFID tags may comprise a plurality of RFID tags. Each RFID tag may be associated with a different machine than the other RFID tags. Each RFID tag may be readable by the RFID reader when operationally proximate to the RFID reader. Each RFID tag may include data useable for changing the configuration of the OCU, whereby the OCU is configurable to be operable only with the corresponding machine associated with the RFID tag from which the data was read by the RFID reader and used for changing the configuration of the OCU.

The at least one or more RFID tags may comprise a first RFID tag associated with a first machine and a second RFID tag associated with a second machine different than the first machine. The first RFID tag may include first data useable for changing the configuration of the OCU such that the OCU is configured to be operable with the first machine. The second RFID tag may include second data useable for changing the configuration of the OCU such that the OCU is configured to be operable with the second machine.

The first data of the first RFID tag may be different than the second data of the second RFID tag. When the configuration of the OCU is changed by using and/or according to the first data read from the first RFID tag by the RFID reader, the OCU may be configured to be operable with the first machine and not be operable with the second machine. When the configuration of the OCU is changed by using and/or according to the second data read from the second RFID tag by the RFID reader, the OCU may be configured to be operable with the second machine and not be operable with the first machine.

The first data of the first RFID tag may include one or more of operating frequency, address, and/or operational configuration of the first machine, such that the OCU is configurable for remotely controlling and/or telecommanding the first machine but not the second machine. The second data of the second RFID tag may include one or more of operating frequency, address, and/or operational configuration of the second machine, such that the OCU is configurable for remotely controlling and/or telecommanding the second machine but not the first machine.

The at least one or more RFID tags may comprise a first RFID tag associated with a first group of one or more machines and a second RFID tag associated with a second group of one or more machines different than the first group of one or more machines. The first RFID tag may include first data useable for changing the configuration of the OCU such that the OCU is configured to be operable with the first group of one or more machines but not the second group of one or more machines. The second RFID tag may include second data useable for changing the configuration of the OCU such that the OCU is configured to be operable with the second group of machines but not the first group of one or more machines.

The OCU may include an emergency stop switch configured to, when activated, transmit an emergency stop signal to at least one machine control unit to trigger an emergency stop of the at least one or more machines. The at least one or more RFID tags may include data identifying an operator of the OCU and readable by the RFID reader when the RFID reader and the at least one or more RFID tags are operationally proximate. When the emergency stop switch of the OCU is activated, the emergency stop signal is transmitted to the at least one machine control unit to thereby trigger the emergency stop of the at least one or more machines; and the operator's identity (based on the data read from the at least one or more RFID tags by the RFID reader) is transmitted to the at least one machine control unit.

The at least one or more machines may comprise one or more of manufacturing equipment, assembly line equipment, a press and stamping machine, a crane, a hoist, vehicles, rail maintenance-of-way machinery, packaging equipment, and/or testing equipment.

An exemplary embodiment includes a method for changing a configuration of an operator control unit (OCU). The method includes obtaining data from at least one or more radio-frequency identification (RFID) tags associated with at least one or more machines by using an RFID reader; and changing the configuration of the OCU by using and/or according to the data obtained from the at least one or more RFID tags such that the OCU is configured to be operable with the at least one or more machines.

In this exemplary method, obtaining data from at least one or more radio-frequency identification (RFID) tags may comprise obtaining OCU configuration data from the at least one or more RFID tags by using the RFID reader. And, changing the configuration of the OCU may comprise changing the configuration of the OCU according to the OCU configuration data such that the OCU is configured to be operable with the at least one or more machines. The OCU configuration data may include one or more of operating frequency, address, and/or operational configuration.

Obtaining data from at least one or more radio-frequency identification (RFID) tags may comprise obtaining a secure identity from the at least one or more RFID tags by using the RFID reader. And, the method may include matching the secure identity to a corresponding OCU configuration; and changing the configuration of the OCU according to the corresponding OCU configuration matched to the secure identity of the at least one or more RFID tags, such that the OCU is configured to be operable with the at least one or more machines. But if the secure identity is not matched to a corresponding OCU configuration, then the method may include denying operation of the at least one or more machines by the OCU.

The method may include locating each said RFID tag at, on, or near a corresponding one of the at least one or more machines.

The method may include transporting the RFID reader to a location relative to a RFID tag such that the RFID reader and the RFID tag are operationally proximate and the RFID tag is readable by the RFID reader. Transporting the RFID reader to the location relative to the RFID tag may include transporting the OCU including the RFID reader integrated with the OCU to the location collectively as a single unit.

Changing the configuration of the OCU may include changing the configuration of the OCU such that the OCU is configurable for remotely controlling and/or telecommanding the at least one or more machines.

Changing the configuration of the OCU may include changing the configuration of the OCU such that the OCU is operable only with the at least one or more machine having the at least one or more RFID tags associated therewith, whereby the OCU is not operable with other adjacent machines.

Changing the configuration of the OCU may include changing one or more of operating frequency, address, and/or operational configuration.

The at least one or more RFID tags may include a first RFID tag of a plurality of RFID tags. Each RFID tag may include data associated with a corresponding one of a plurality of different machines. The first RFID tag may include first data corresponding to a first machine. The method may include obtaining the first data from the first RFID tag by using the RFID reader; and changing the configuration of the OCU by using and/or according to the first data obtained from the first RFID tag such that the OCU is configured to be operable with the first machine.

The plurality of RFID tags may also include a second RFID tag including second data corresponding to a second machine. The method may include obtaining the second data from the second RFID tag by using the RFID reader; and changing the configuration of the OCU by using and/or according to the second data obtained from the second RFID tag such that the OCU is configured to be operable with the second machine.

The first data of the first RFID tag may be different than the second data of the second RFID tag. When the configuration of the OCU is changed by using and/or according to the first data read from the first RFID tag by the RFID reader, the OCU may be configured to be operable with the first machine and not be operable with the second machine. When the configuration of the OCU is changed by using and/or according to the second data read from the second RFID tag by the RFID reader, the OCU may be configured to be operable with the second machine and not be operable with the first machine.

The first data of the first RFID tag may include one or more of operating frequency, address, and/or operational configuration, such that the OCU is configurable for remotely controlling and/or telecommanding the first machine but not the second machine. The second data of the second RFID tag may include one or more of operating frequency, address, and/or operational configuration, such that the OCU is configurable for remotely controlling and/or telecommanding the second machine but not the first machine.

An exemplary embodiment includes a method relating to changing a configuration of an operator control unit (OCU). The method includes providing at least one radio-frequency identification (RFID) tag that includes data for at least one or more machines and readable by an RFID reader when the RFID reader and the RFID tag are operationally proximate. The data is useable for changing the configuration of the OCU such that the OCU is configured to be operable with the at least one or more machines.

The method may include positioning the RFID tag at, on, or near the at least one or more machines.

The data may be useable for changing the configuration of the OCU such that the OCU is configurable for remotely controlling and/or telecommanding the at least one or more machines.

The data may be useable for changing the configuration of the OCU such that the OCU is operable only with the at least one or more machines having the RFID tag associated therewith, whereby the OCU is not operable with other adjacent machines.

The data of the RFID tag may include one or more of operating frequency, address, and/or operational configuration.

The data of the RFID tag may include a secure identity useable for matching to a corresponding OCU configuration.

Providing at least one RFID tag may comprise providing a plurality of RFID tags. Each RFID tag data may be associated with a corresponding one of a plurality of different machines that is useable for changing the configuration of the OCU such that the OCU is configurable to be operable only with the corresponding one of the plurality of different machines associated with the RFID tag from which the data was read by the RFID reader and used for changing the configuration of the OCU.

The method may include positioning each RFID tag at, on, or near the corresponding one of the plurality of different machines.

Providing at least one RFID tag may comprise providing at least a first RFID tag and a second RFID tag. The first RFID tag may include first data useable for changing the configuration of the OCU such that the OCU is configured to be operable with a first one or more machines. The second RFID tag may include second data useable for changing the configuration of the OCU such that the OCU is configured to be operable with a second one or more machines.

The first data of the first RFID tag may be different than the second data of the second RFID tag. When the configuration of the OCU is changed by using and/or according to the first data read from the first RFID tag by the RFID reader, the OCU may be configured to be operable with the first one or more machines and not be operable with the second one or more machines. When the configuration of the OCU is changed by using and/or according to the second data read from the second RFID tag by the RFID reader, the OCU may be configured to be operable with the second one or more machines and not be operable with the first one or more machines.

The first data of the first RFID tag may include one or more of operating frequency, address, and/or operational configuration, such that the OCU is configurable for remotely controlling and/or telecommanding the first one or more machines but not the second one or more machines. The second data of the second RFID tag may include one or more of operating frequency, address, and/or operational configuration, such that the OCU is configurable for remotely controlling and/or telecommanding the second one or more machines but not the first one or more machines.

The method may include positioning the at least one RFID tag at, on, or near the at least one or more machines including one or more of manufacturing equipment, assembly line equipment, a press and stamping machine, a crane, a hoist, vehicles, rail maintenance-of-way machinery, packaging equipment, and/or testing equipment.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are exemplary in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges.

The terminology used herein is for the purpose of describing particular example embodiments only and is not intended to be limiting. For example, when permissive phrases, such as "may comprise", "may include", and the like, are used herein, at least one embodiment comprises or includes the feature(s). As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
an operator control unit (OCU);
a radio-frequency identification (RFID) reader; and
at least one or more radio-frequency identification (RFID) tags associated with at least one or more industrial machines and readable by the RFID reader when the RFID reader and the at least one or more RFID tags are operationally proximate, the at least one or more RFID tags including data useable for changing a configuration of the OCU characterized in that the OCU is configured to receive the data via the RFID reader from the RFID tags and is further configured to change its configuration correspondingly such that it is operable for remotely controlling and/or telecommanding the at least one or more industrial machines;
wherein:
the OCU, the RFID reader, and/or the at least one or more RFID tags includes a secure protocol for identifying an operator having pre-defined authorization rights; and
the OCU is configured to allow the identified operator to control a specific industrial machine of the at least one or more industrial machines based on the pre-defined authorization rights specifying what control actions the operator is permitted to use for the specific industrial machine, the pre-defined authorization rights including one or more:
powering the specific industrial machine on or off;
starting operation of the specific industrial machine;
stopping operation of the specific industrial machine;
changing operation of the specific industrial machine;
increasing or decreasing speed of the specific industrial machine;
selecting a different mode of operation for the specific industrial machine; and/or
controlling movement of the specific industrial machine.

2. The system of claim 1, wherein the data of the at least one or more RFID tags includes OCU configuration data useable for changing the configuration of the OCU such that the OCU is configured to be operable with the at least one or more industrial machines.

3. The system of claim 2, wherein the OCU configuration data includes one or more of operating frequency, address, and/or operational configuration of the at least one or more industrial machines.

4. The system of claim 1, wherein the system includes the RFID reader that is portable and/or manually transportable by an operator of the OCU to a location relative to an RFID tag such that the RFID reader and the RFID tag are operationally proximate to each other and the RFID tag is readable by the RFID reader.

5. The system of claim 1, wherein:
each said RFID tag is located at, on, or near a corresponding one of the at least one or more industrial machines; and/or
the system includes the OCU having the RFID reader integrated therein such that the OCU and the RFID reader are collectively transportable and/or operable as a single unit; and/or
the RFID reader is coupled for communication with the OCU for communicating the data stored on the at least one or more RFID tags and read by the RFID reader to the OCU.

6. The system of claim 1, wherein the data is useable for changing the configuration of the OCU such that the OCU is operable only with the at least one or more industrial machines associated with the corresponding at least one or more RFID tags, whereby the OCU is not operable with other adjacent industrial machines.

7. The system of claim 1, wherein:
the at least one or more RFID tags comprise a plurality of RFID tags, each said RFID tag associated with a different industrial machine than the other RFID tags;
each said RFID tag is readable by the RFID reader when operationally proximate to the RFID reader; and
each said RFID tag includes data useable for changing the configuration of the OCU, whereby the OCU is configurable to be operable only with the corresponding industrial machine associated with the RFID tag from which the data was read by the RFID reader and used for changing the configuration of the OCU.

8. The system of claim 1, wherein:
the at least one or more RFID tags comprise a first RFID tag associated with a first industrial machine and a second RFID tag associated with a second industrial machine different than the first industrial machine;
the first RFID tag includes first data useable for changing the configuration of the OCU such that the OCU is configured to be operable with the first industrial machine; and
the second RFID tag includes second data useable for changing the configuration of the OCU such that the OCU is configured to be operable with the second industrial machine.

9. The system of claim 8, wherein the first data of the first RFID tag is different than the second data of the second RFID tag such that:
when the configuration of the OCU is changed by using and/or according to the first data read from the first RFID tag by the RFID reader, the OCU is configured to be operable with the first industrial machine and is not operable with the second industrial machine; and
when the configuration of the OCU is changed by using and/or according to the second data read from the second RFID tag by the RFID reader, the OCU is configured to be operable with the second industrial machine and is not operable with the first industrial machine.

10. The system of claim 8, wherein:
the first data of the first RFID tag includes one or more of operating frequency, address, and/or operational configuration of the first industrial machine, such that the OCU is configurable for remotely controlling and/or telecommanding the first industrial machine but not the second industrial machine; and
the second data of the second RFID tag includes one or more of operating frequency, address, and/or operational configuration of the second industrial machine, such that the OCU is configurable for remotely controlling and/or telecommanding the second industrial machine but not the first industrial machine.

11. The system of claim 1, wherein:
the at least one or more RFID tags comprise a first RFID tag associated with a first group of one or more industrial machines and a second RFID tag associated with a second group of one or more industrial machines different than the first group of one or more industrial machines;
the first RFID tag includes first data useable for changing the configuration of the OCU such that the OCU is configured to be operable with the first group of one or more industrial machines but not the second group of one or more industrial machines; and the second RFID tag includes second data useable for changing the configuration of the OCU such that the OCU is configured to be operable with the second group of industrial machines but not the first group of one or more industrial machines.

12. The system of claim 1, wherein:
the OCU includes an emergency stop switch configured to, when activated, transmit an emergency stop signal to at least one machine control unit to trigger an emergency stop of the at least one or more industrial machines; and
the at least one or more RFID tags includes data identifying an operator of the OCU and readable by the RFID reader when the RFID reader and the at least one or more RFID tags are operationally proximate;
whereupon activation of the emergency stop switch of the OCU:
the emergency stop signal is transmitted to the at least one machine control unit to thereby trigger the emergency stop of the at least one or more industrial machines; and
the operator's identity based upon the data read from the at least one or more RFID tags by the RFID reader is transmitted to the at least one machine control unit.

13. The system of claim 1, wherein the at least one or more industrial machines comprise one or more of manufacturing equipment, assembly line equipment, a press and stamping machine, a crane, a hoist, vehicles, rail maintenance-of-way machinery, packaging equipment, and/or testing equipment.

14. The system of claim 1, wherein:
each said RFID tag is located at, on, or within a range of a corresponding one of the at least one or more industrial machines in which the corresponding one of the at least one or more industrial machines is remotely controllable by the OCU; and
the data stored on a specific RFID tag of the at least one or more RFID tags is useable for customizing or tailoring the configuration of the OCU such that the OCU is configurable for remotely controlling and/or telecommanding only the corresponding one of the at least one or more industrial machines for which the specific RFID tag was positioned at, on, or within the range of the corresponding one of the at least one or more industrial machines.

15. A system comprising:
an operator control unit (OCU);
a radio-frequency identification (RFID) reader; and
at least one or more radio-frequency identification (RFID) tags associated with at least one or more industrial machines and readable by the RFID reader when the RFID reader and the at least one or more RFID tags are operationally proximate, the at least one or more RFID tags including data useable for changing a configuration of the OCU characterized in that the OCU is configured to receive the data via the RFID reader from the RFID tags and is further configured to change its configuration correspondingly such that it is operable for remotely controlling and/or telecommanding the at least one or more industrial machines;
wherein:
the OCU includes the RFID reader such that the OCU and RFID reader are operable in at least two modes including user authorization and OCU configuration to match a specific industrial machine;
for user authorization, the RFID reader is positionable for reading an ID badge, and the OCU is configured to associate or match an ID badge identity to a specific industrial machine and a specific set of available operator commands associated with the ID badge identity; and
for OCU configuration, the RFID reader is positionable for reading a specific RFID tag of the least one or more RFID tags that is located on or near a specific industrial machine of the at least one or more industrial machines, such that the configuration of the OCU is configured to be operable for remotely controlling and/or telecommanding the specific industrial machine.

16. A system comprising:
an operator control unit (OCU);
a radio-frequency identification (RFID) reader; and
at least one or more radio-frequency identification (RFID) tags associated with at least one or more industrial machines and readable by the RFID reader when the RFID reader and the at least one or more RFID tags are operationally proximate, the at least one or more RFID tags including data useable for changing a configuration of the OCU characterized in that the OCU is configured to receive the data via the RFID reader from the RFID tags and is further configured to change its configuration correspondingly such that it is operable for remotely controlling and/or telecommanding the at least one or more industrial machines;
wherein the at least one or more industrial machines comprise a specific overhead crane, and wherein the data is useable for changing the configuration of the OCU such that the OCU is operable only for remotely controlling and/or telecommanding the specific overhead crane of the at least one or more industrial machines that is associated with the corresponding at least one or more RFID tags, whereby the OCU is not operable with other adjacent industrial machines.

17. The system of claim 16, wherein the data of the at least one or more RFID tags includes a secure identity useable for matching to a corresponding OCU configuration.

18. The system of claim 16, wherein the data of the at least one or more RFID tags comprises OCU configuration data that includes one or more of operating frequency, address, and/or operational configuration of the at least one or more industrial machines.

19. The system of claim 16, wherein the OCU includes the RFID reader integrated therein such that the OCU and the RFID reader are collectively portable, manually transportable, and operable as a single unit by an operator of the OCU to a location relative to an RFID tag such that the RFID reader and the RFID tag are operationally proximate to each other and the RFID tag is readable by the RFID reader.

20. The system of claim 16, wherein:
the at least one or more RFID tags comprise a first RFID tag associated with a first industrial machine and a second RFID tag associated with a second industrial machine different than the first industrial machine;
the first RFID tag includes first data useable for changing the configuration of the OCU such that the OCU is configured to be operable for remotely controlling and/or telecommanding the first industrial machine; and
the second RFID tag includes second data useable for changing the configuration of the OCU such that the OCU is configured to be operable for remotely controlling and/or telecommanding the second industrial machine.

21. The system of claim 20, wherein the first data of the first RFID tag is different than the second data of the second RFID tag such that:
when the configuration of the OCU is changed by using and/or according to the first data read from the first RFID tag by the RFID reader, the OCU is configured to be operable for remotely controlling and/or telecommanding the first industrial machine and is not operable for remotely controlling and/or telecommanding the second industrial machine; and
when the configuration of the OCU is changed by using and/or according to the second data read from the second RFID tag by the RFID reader, the OCU is configured to be operable for remotely controlling and/or telecommanding the second industrial machine and is not operable for remotely controlling and/or telecommanding the first industrial machine.

22. The system of claim 20, wherein:
the first data of the first RFID tag includes one or more of operating frequency, address, and/or operational configuration of the first industrial machine, such that the OCU is configurable for remotely controlling and/or telecommanding the first industrial machine but not the second industrial machine; and
the second data of the second RFID tag includes one or more of operating frequency, address, and/or operational configuration of the second industrial machine, such that the OCU is configurable for remotely controlling and/or telecommanding the second industrial machine but not the first industrial machine.

23. The system of claim 16, wherein:
the OCU includes an emergency stop switch configured to, when activated, transmit an emergency stop signal to at least one machine control unit to trigger an emergency stop of the at least one or more industrial machines; and
the at least one or more RFID tags includes data identifying an operator of the OCU and readable by the RFID reader when the RFID reader and the at least one or more RFID tags are operationally proximate;
whereupon activation of the emergency stop switch of the OCU:
the emergency stop signal is transmitted to the at least one machine control unit to thereby trigger the emergency stop of the at least one or more industrial machines; and
the operator's identity based upon the data read from the at least one or more RFID tags by the RFID reader is transmitted to the at least one machine control unit.

24. A system comprising:
an operator control unit (OCU);
a radio-frequency identification (RFID) reader; and
at least one or more radio-frequency identification (RFID) tags associated with at least one or more industrial machines and readable by the RFID reader when the RFID reader and the at least one or more RFID tags are operationally proximate, the at least one or more RFID tags including data useable for changing a configuration of the OCU characterized in that the OCU is configured to receive the data via the RFID reader from the RFID tags and is further configured to change its configuration correspondingly such that it is operable for remotely controlling and/or telecommanding the at least one or more industrial machines;
wherein:
the at least one or more RFID tags comprise a plurality of RFID tags, each said RFID tag associated with a different industrial machine than the other RFID tags;
each said RFID tag is readable by the RFID reader when operationally proximate to the RFID reader; and
each said RFID tag includes data useable for changing the configuration of the OCU, whereby the OCU is configurable to be operable only for remotely controlling and/or telecommanding the corresponding industrial machine associated with the RFID tag from which the data was read by the RFID reader and used for changing the configuration of the OCU.

25. The system of claim 24, wherein the data of the at least one or more RFID tags includes a secure identity useable for matching to a corresponding OCU configuration.

26. A system comprising:
an operator control unit (OCU);
a radio-frequency identification (RFID) reader; and
at least one or more radio-frequency identification (RFID) tags associated with at least one or more industrial machines and readable by the RFID reader when the RFID reader and the at least one or more RFID tags are operationally proximate, the at least one or more RFID tags including data useable for changing a configuration of the OCU characterized in that the OCU is configured to receive the data via the RFID reader from the RFID tags and is further configured to change its configuration correspondingly such that it is operable for remotely controlling and/or telecommanding the at least one or more industrial machines;
wherein:
the at least one or more RFID tags comprise a first RFID tag associated with a first group of one or more industrial machines and a second RFID tag associated with a second group of one or more industrial machines different than the first group of one or more industrial machines;
the first RFID tag includes first data useable for changing the configuration of the OCU such that the OCU is configured to be operable for remotely controlling and/or telecommanding the first group of one or more industrial machines but not the second group of one or more industrial machines; and
the second RFID tag includes second data useable for changing the configuration of the OCU such that the OCU is configured to be operable for remotely controlling and/or telecommanding the second group of industrial machines but not the first group of one or more industrial machines.

27. A system comprising:
an operator control unit (OCU);
a radio-frequency identification (RFID) reader; and
at least one or more radio-frequency identification (RFID) tags associated with at least one or more industrial machines and readable by the RFID reader when the RFID reader and the at least one or more RFID tags are operationally proximate, the at least one or more RFID tags including data useable for changing a configuration of the OCU characterized in that the OCU is configured to receive the data via the RFID reader from the RFID tags and is further configured to change its configuration correspondingly such that it is operable for remotely controlling and/or telecommanding the at least one or more industrial machines;
wherein:
the at least one or more industrial machines comprise one or more of manufacturing equipment, assembly line equipment, a press and stamping machine, a crane, a hoist, vehicles, rail maintenance-of-way machinery, packaging equipment, and/or testing equipment; and the data of the at least one or more RFID tags comprises operating frequency, address, and operational configuration including:

one or more switch/joystick functions of the OCU;

a switch/joystick range of the OCU;

a switch/joystick speed of the OCU;

one or more operational zone restrictions; and/or reconfiguration of a display of the OCU.

\* \* \* \* \*